(12) United States Patent
Okouchi

(10) Patent No.: US 8,672,162 B2
(45) Date of Patent: Mar. 18, 2014

(54) POWER TOOL INCLUDING A RESERVOIR AND A CAP ATTACHED TO THE OPENING OF THE RESERVOIR

(75) Inventor: Katsumi Okouchi, Anjo (JP)

(73) Assignee: Makita Corporation, Anjo-Shi (JP)

( * ) Notice: Subject to any disclaimer, the term of this patent is extended or adjusted under 35 U.S.C. 154(b) by 0 days.

(21) Appl. No.: 13/320,664

(22) PCT Filed: Apr. 6, 2010

(86) PCT No.: PCT/JP2010/056245
§ 371 (c)(1),
(2), (4) Date: Nov. 15, 2011

(87) PCT Pub. No.: WO2010/134394
PCT Pub. Date: Nov. 25, 2010

(65) Prior Publication Data
US 2012/0061393 A1    Mar. 15, 2012

(30) Foreign Application Priority Data

May 20, 2009    (JP) .................................. 2009-122281

(51) Int. Cl.
*B65D 51/16*    (2006.01)
*B65D 35/32*    (2006.01)
*F16K 15/14*    (2006.01)

(52) U.S. Cl.
USPC ............ 220/203.17; 220/203.14; 220/203.18; 220/212; 137/846

(58) Field of Classification Search
CPC ........................................................ B60K 15/05
USPC .................. 220/203.11–203.18, 203.28, 212; 137/846, 847
See application file for complete search history.

(56) References Cited

U.S. PATENT DOCUMENTS 1,208,356 A    12/1916 Nesbitt
1,865,764 A *  7/1932 Keenan ......................... 215/260

(Continued)

FOREIGN PATENT DOCUMENTS

CN    2071109 U    2/1991
CN    1724202 A    1/2006

(Continued)

OTHER PUBLICATIONS

U.S. Appl. No. 13/320,606, filed Nov. 15, 2011 in the name of Katsumi Okouchi.

(Continued)

*Primary Examiner* — J. Gregory Pickett
*Assistant Examiner* — Ned A Walker
(74) *Attorney, Agent, or Firm* — Oliff & Berridge, PLC

(57) ABSTRACT

A power tool that includes a reservoir that holds oil and a cap attached to the reservoir. The cap may include a cap body having a communicating path and a valve member covering the communicating path. The valve member may include an elastic part that has a projecting part, which projects from the elastic part and includes a slit. The elastic part and the projecting part being configured to deform to the inner surface side such that the slit of the projecting part opens if the pressure outside the reservoir becomes higher than the pressure inside the reservoir and a difference between the pressure inside the reservoir and the pressure outside the reservoir exceeds a predetermined value. The elastic part and the projecting part also being configured to deform to the outer side surface such that the slit of the projecting part opens if the pressure inside the reservoir becomes higher than the pressure outside the reservoir.

5 Claims, 7 Drawing Sheets

(56) References Cited

U.S. PATENT DOCUMENTS

| | | | | |
|---|---|---|---|---|
| 2,297,378 | A | * | 9/1942 | Wittenberg .................. 137/534 |
| 2,491,543 | A | | 5/1948 | Alfonso |
| 2,444,132 | A | | 6/1948 | Gorden et al. |
| 2,533,771 | A | * | 12/1950 | De Frees .................. 220/203.17 |
| 3,143,441 | A | * | 8/1964 | Coleman et al. ............... 429/54 |
| 3,187,918 | A | * | 6/1965 | Moore ........................ 215/11.6 |
| 3,194,284 | A | | 7/1965 | Walker |
| 3,557,986 | A | * | 1/1971 | Poole, Jr. ..................... 215/228 |
| 3,621,876 | A | * | 11/1971 | Campbell .................... 137/846 |
| 3,866,320 | A | | 2/1975 | Progl |
| 3,967,645 | A | * | 7/1976 | Gregory ..................... 137/846 |
| 4,165,816 | A | * | 8/1979 | Tupper .................... 220/203.14 |
| 4,271,976 | A | * | 6/1981 | Detwiler ................ 220/203.07 |
| 4,458,711 | A | * | 7/1984 | Flider ............................. 137/71 |
| 4,524,805 | A | * | 6/1985 | Hoffman ..................... 137/846 |
| 4,540,103 | A | * | 9/1985 | Kasugai et al. .......... 220/203.23 |
| 4,747,501 | A | * | 5/1988 | Greaves ....................... 215/253 |
| 4,835,868 | A | | 6/1989 | Nagashima |
| 4,896,789 | A | * | 1/1990 | Federspiel .............. 220/203.17 |
| 4,987,740 | A | * | 1/1991 | Coleman ......................... 60/583 |
| 5,396,705 | A | | 3/1995 | Leini |
| 5,730,183 | A | | 3/1998 | Kremsler |
| 6,079,582 | A | | 6/2000 | Nickel et al. |
| 6,092,551 | A | * | 7/2000 | Bennett ....................... 137/846 |
| 6,237,228 | B1 | | 5/2001 | Moody |
| 6,585,005 | B1 | * | 7/2003 | Raftis et al. ................... 137/850 |
| 6,619,497 | B2 | * | 9/2003 | Freiler ......................... 220/201 |
| 6,745,914 | B2 | * | 6/2004 | Hagano et al. ................ 220/288 |
| 6,795,987 | B2 | * | 9/2004 | Cornwall ......................... 4/679 |
| 6,877,233 | B1 | | 4/2005 | Franke |
| 7,185,437 | B2 | | 3/2007 | Behbahany |
| 7,481,000 | B2 | | 1/2009 | Tynes et al. |
| 8,079,482 | B2 | * | 12/2011 | Pfenniger et al. ............ 215/11.1 |
| 8,233,818 | B2 | * | 7/2012 | Sasaki et al. ................... 399/106 |
| 8,251,234 | B2 | * | 8/2012 | Rigert et al. ................ 215/11.1 |
| 2003/0071006 | A1 | * | 4/2003 | Kolb ............................ 215/11.1 |
| 2004/0148788 | A1 | | 8/2004 | Behbahany |
| 2004/0222224 | A1 | * | 11/2004 | Plester ..................... 220/203.17 |
| 2006/0016081 | A1 | | 1/2006 | Keeton et al. |
| 2006/0075644 | A1 | | 4/2006 | Keeton et al. |
| 2006/0196058 | A1 | | 9/2006 | Warfel et al. |
| 2006/0230900 | A1 | | 10/2006 | Bergquist |
| 2009/0007439 | A1 | | 1/2009 | Sugishita |
| 2009/0119934 | A1 | | 5/2009 | Sugishita |
| 2009/0241353 | A1 | | 10/2009 | Ericson et al. |
| 2009/0314733 | A1 | * | 12/2009 | Pfenniger et al. ............ 215/11.1 |
| 2009/0314736 | A1 | * | 12/2009 | Rigert et al. ................. 215/11.4 |
| 2010/0088905 | A1 | | 4/2010 | Pellenc |
| 2010/0284710 | A1 | * | 11/2010 | Sasaki et al. ................. 399/262 |
| 2010/0293797 | A1 | | 11/2010 | Fisher et al. |
| 2012/0012584 | A1 | * | 1/2012 | Chameroy et al. ....... 220/203.01 |
| 2012/0061115 | A1 | * | 3/2012 | Okouchi ........................ 173/171 |

FOREIGN PATENT DOCUMENTS

| | | |
|---|---|---|
| CN | 1756631 A | 4/2006 |
| CN | 200977856 Y | 11/2007 |
| DE | 19805821 A1 | 8/1998 |
| DE | 103 53 737 A1 | 6/2005 |
| DE | 20 2006 019 362 U1 | 11/2007 |
| EP | 1619004 A1 | 1/2005 |
| JP | A-50-32516 | 3/1975 |
| JP | S54-58514 U | 4/1979 |
| JP | U-55-163567 | 11/1980 |
| JP | U-56-52653 | 5/1981 |
| JP | U-58-192003 | 12/1983 |
| JP | U-62-25180 | 2/1987 |
| JP | U-1-69979 | 5/1989 |
| JP | A-9-14475 | 1/1997 |
| JP | B2-3135857 | 2/2001 |
| JP | A-2005-199713 | 7/2005 |
| JP | A-2006-27261 | 2/2006 |
| JP | A-2006-103301 | 4/2006 |
| JP | A-2006-138331 | 6/2006 |
| JP | A-2006-238876 | 9/2006 |
| WO | WO 2008-122715 A1 | 10/2008 |

OTHER PUBLICATIONS

U.S. Appl. No. 13/320,705, filed Nov. 15, 2011 in the name of Katsumi Okouchi.
International Search Report issued in International Application No. PCT/JP2010/056243 dated Jun. 22, 2010 (with translation).
Written Opinion of the International Searching Authority issued in International Application No. PCT/JP2010/056243 dated Jun. 22, 2010 (with translation).
International Search Report issued in International Application No. PCT/JP2010/056244 dated Jul. 6, 2010 (with translation).
Written Opinion of the International Searching Authority issued in International Application No. PCT/JP2010/056244 dated Jul. 6, 2010 (with translation).
International Search Report issued in International Application No. PCT/JP2010/056245 dated Jun. 22, 2010 (with translation).
Written Opinion of the International Searching Authority issued in International Application No. PCT/JP2010/056245 Jun. 22, 2010 (with translation).
Feb. 26, 2013 Office Action issued in Japanese Patent Application No. 2009-122280 (with translation).
Feb. 5, 2013 Office Action issued in Russian Patent Application No. 2011151825 (with translation).
Feb. 7, 2013 Office Action issued in Russian Patent Application No. 2011151828 (with translation).
Apr. 15, 2013 Notice of Allowance issued in U.S. Appl. No. 13/320,606.
Apr. 30, 2013 Office Action issued in Japanese Application No. 2009-122281 (with translation).
Apr. 23, 2013 Office Action issued in Japanese Application No. 2009-122279 (with translation).
Nov. 14, 2013 Search Report issued in European Patent Application No. 10777627.0-1709/2433754.
Dec. 3, 2013 Office Action issued in Japanese Patent Application No. 2009-122281 (with English Translation).
Aug. 14, 2013 Office Action issued in Chinese Patent Application No. 201080032523.4 (with English Translation).
Sep. 30, 2013 Office Action issued in Chinese Patent Application No. 201080032516.4 (with English Translation).
Oct. 29, 2013 Search Report issued in European Patent Application No. 10777628.8-1709/2433766.

* cited by examiner

US 8,672,162 B2

POWER TOOL INCLUDING A RESERVOIR AND A CAP ATTACHED TO THE OPENING OF THE RESERVOIR

TECHNICAL FIELD

The present application discloses a power tool. More specifically, the present application discloses an art for adjusting a gas pressure inside a reservoir reserving oil that is arranged in the power tool.

BACKGROUND ART

An art is known for adjusting a gas pressure inside a reservoir reserving oil by forming a communicating path in a cap of the reservoir and arranging a valve component. For example, Japanese Patent Application Laid-open No. H9-14475 discloses a cap for a fuel tank. As the valve component arranged on the cap, an air intake valve that introduces air into the fuel tank from an outside and an exhaust valve that discharges a gas inside the fuel tank to the outside are formed. Consequently, the gas pressure inside the fuel tank is maintained within a predetermined range.

SUMMARY OF INVENTION

Technical Problem

With the valve component described above, the air intake valve and the exhaust valve are formed separately. Therefore, a structure of the valve component becomes complicated. An art disclosed in the present application has been made in consideration of the problem described above and an object thereof is to simplify the configuration of the valve component.

Solution to Technical Problem

An art disclosed in the present application is realized in a power tool comprising a reservoir reserving oil. The power tool comprises a cap attached to an opening of the reservoir. The cap comprises a cap body and a valve member. The cap body comprises a communicating path communicating an inside of the reservoir to an outside of the reservoir. The valve member is attached to the cap body and covers the communicating path. The valve member is a sheet-shaped portion and made from elastomer. The valve member comprises an elastic part and a projecting part. The elastic member has a central portion that is capable of elastically deforming to both sides of an inner surface side and an outer surface side relative to a peripheral portion of the elastic part. The inner surface receives a pressure inside the reservoir and the outer surface receives a pressure outside the reservoir. The projecting part projects from the elastic part. The projecting part has a slit on a top portion of the projecting part.

With this valve member, the elastic part and the projecting part elastically deform due to a pressure difference between the inside and the outside of the reservoir, and the slit arranged on the projecting part opens. Accordingly, when a gas pressure inside the reservoir is higher than a gas pressure outside the reservoir, a gas inside the reservoir may be discharged to the outside of the reservoir. In addition, when the gas pressure inside the reservoir is lower than the gas pressure outside the reservoir, a gas outside the reservoir may be introduced into the reservoir. In other words, the valve member functions both as a gas intake valve that introduces a gas into the reservoir and an exhaust valve that discharges a gas inside the reservoir to the outside of the reservoir. According to this configuration, an air intake valve and an exhaust valve need not be configured separately.

The elastic part may have a shape bulging toward the inner surface side. The projecting part may have a shape projecting toward the inner surface side.

With this configuration, when the gas pressure outside the reservoir is higher than the gas pressure inside the reservoir, the projecting part deforms to open the slit of the projecting part. Accordingly, a gas may be introduced into the reservoir. On the other hand, when the gas pressure inside the reservoir is higher than the gas pressure outside the reservoir, deformation of the projecting part is insufficient to open the slit of the projecting part. However, when the gas pressure inside the reservoir is higher than the gas pressure outside the reservoir, the elastic part deforms significantly and, the projecting part deforms thereby to open the slit of the projecting part. Accordingly, the gas inside the reservoir may be discharged in a smooth manner and the gas outside the reservoir may be introduced into the reservoir also in a smooth manner.

The projecting part may comprise a pair of flat plate portions. The flat plate portions may oppose each other in a perpendicular direction relative to the slit.

The valve member may comprise an integrally-formed seal member. The seal member may contact an edge of the opening of the reservoir to seal a clearance between the reservoir and the cap body. According to this configuration, the seal member that prevents fluid inside the reservoir from leaking out is integrally formed with the valve member. Consequently, assembly of the cap may be simplified.

The valve member may retain the cap body and be capable of swinging relative to the cap body. A biasing member, biasing the valve member toward the edge of the opening of the reservoir, may be disposed between the cap body and the valve member. According to this configuration, since the valve member swings when the seal member and the edge of the opening come into contact with each other, a formation of a clearance between the seal member and the edge of the opening as a result of contacting the seal member with only a part of the edge of the opening may be prevented.

Advantageous Effects of Invention

According to the art disclosed in the present specification, a configuration of the valve member may be simplified. As a result, the valve member may be downsized.

DESCRIPTION OF EMBODIMENT

Preferred aspects of below embodiment will be listed.
(1) The cap described above is favorably used in an oil cap of a chain saw. The chain saw comprises a chain saw body, a guide bar, a saw chain, an oil tank, and an oil cap. The guide bar is attached to the chain saw body so as to be capable of moving reciprocally relative to the chain saw body. The oil tank reserves lubricating oil that is supplied to the saw chain and the guide bar. The oil cap is rotatably arranged on the oil tank and closes an opening of the oil tank. A communicating hole communicating an inside of the oil tank to outside air is formed in the oil cap. The valve member is attached to the oil cap so as to cover the communicating hole.

(2) An elastic part of the valve member described above has a shape which is curved like a dome, which corresponds to a part of a spherical surface, on a one surface side that receives an internal pressure of the reservoir. A projecting part of the valve member projects toward an outer side of the elastic part that bends in a spherical shape.

Figure 1:
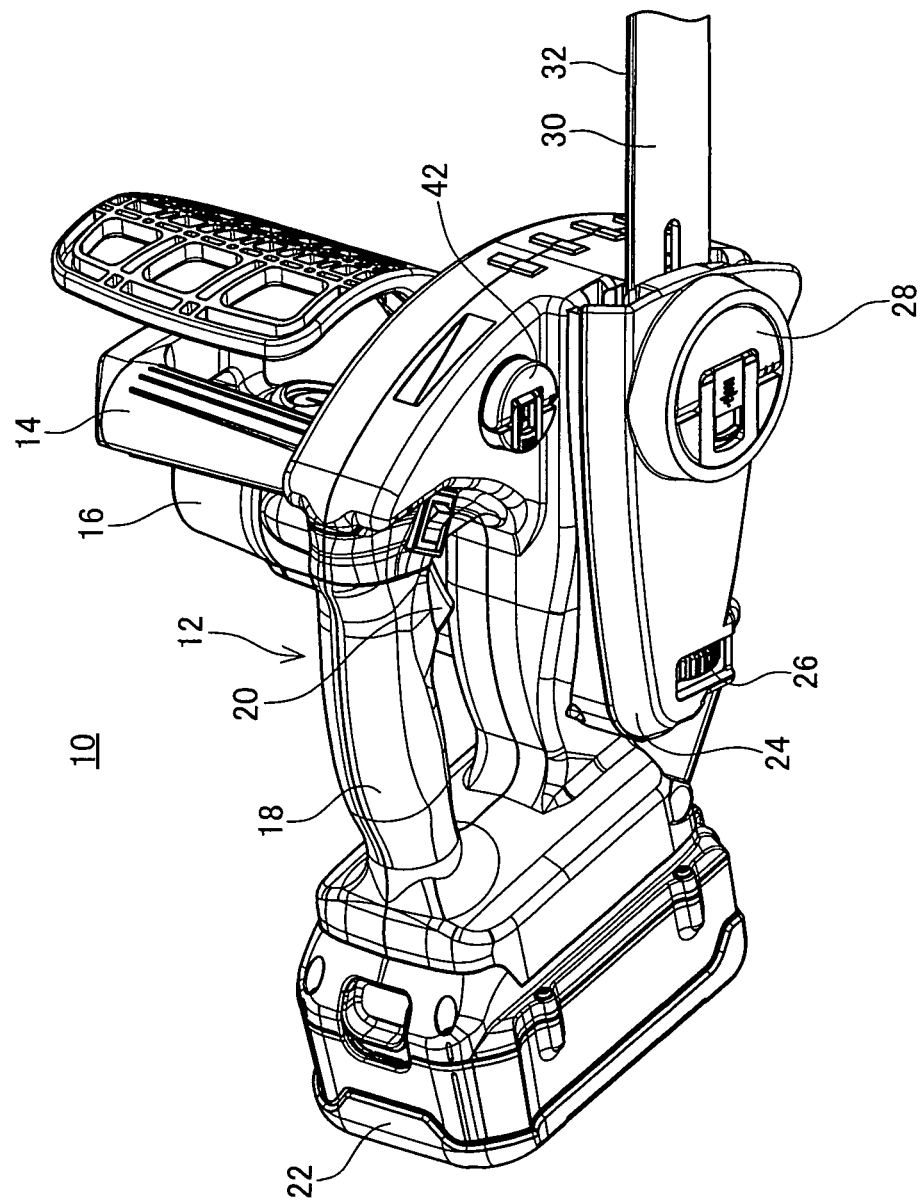
FIG. 1 shows an external view of a chain saw.
Figure 2:
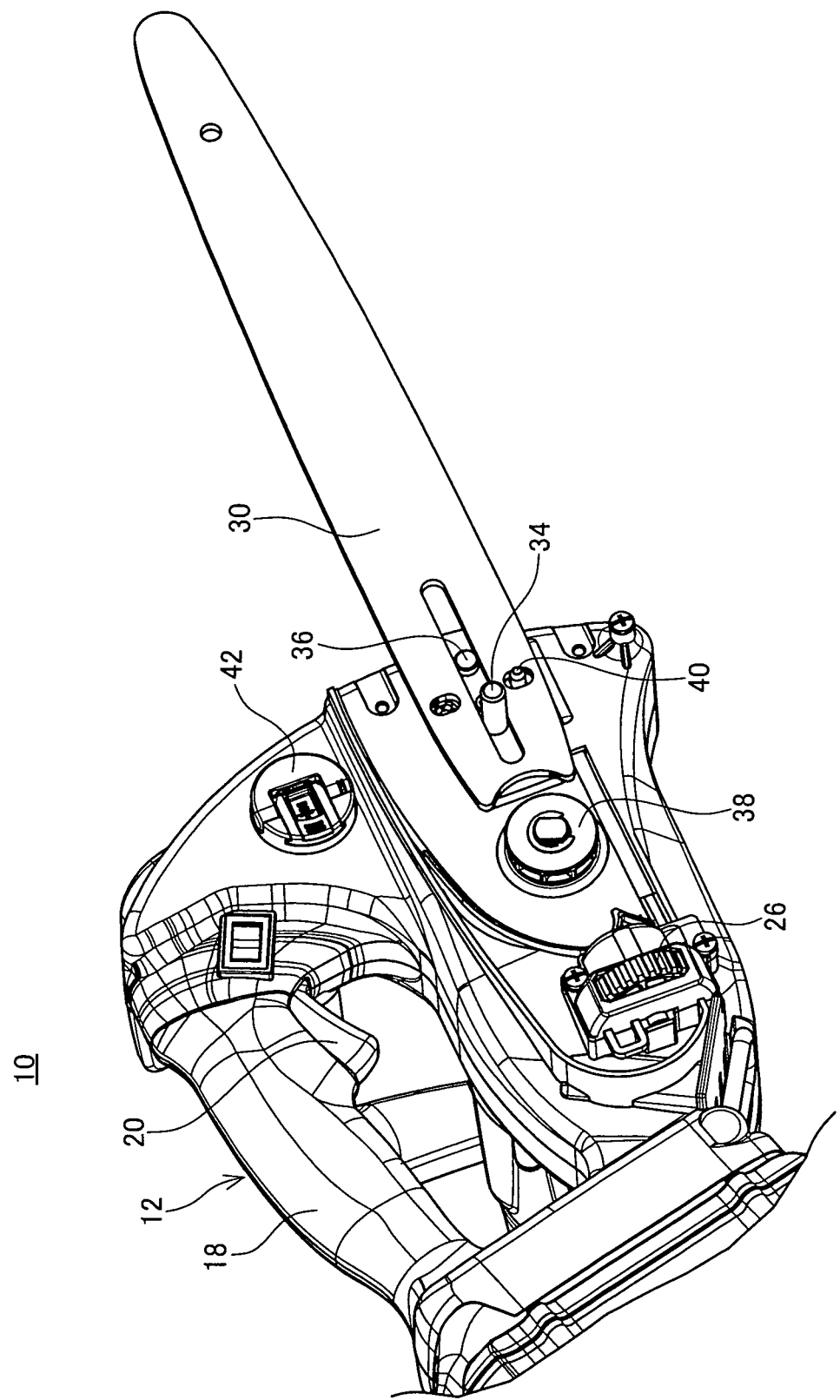
FIG. 2 shows an external view of a part of the chain saw.

An embodiment will now be described with reference to the drawings. FIG. 1 shows an external view of a chain saw 10. FIG. 2 shows an external view of the chain saw 10 in a state in which a cover 24 and a saw chain 32 have been removed from a body 12 which will be described later. The chain saw 10 comprises the body 12, a guide bar 30 attached to the body 12, and the saw chain 32.

As shown in FIGS. 1 and 2, the body 12 comprises a motor 16, a first grip 14, a second grip 18, and a sprocket 38. A trigger switch 20 that activates the chain saw 10 is arranged on the second grip 18. The sprocket 38 is arranged on a side surface of the body 12 and is rotatably supported by the body 12. The sprocket 38 is connected to the motor 16 and is rotatably driven by the motor 16. The motor 16 is configured so that power is supplied to the motor 16 from a battery 22 in conjunction with an operation performed on the trigger switch 20. The battery 22 is detachably attached to the body 12.

Figure 9:
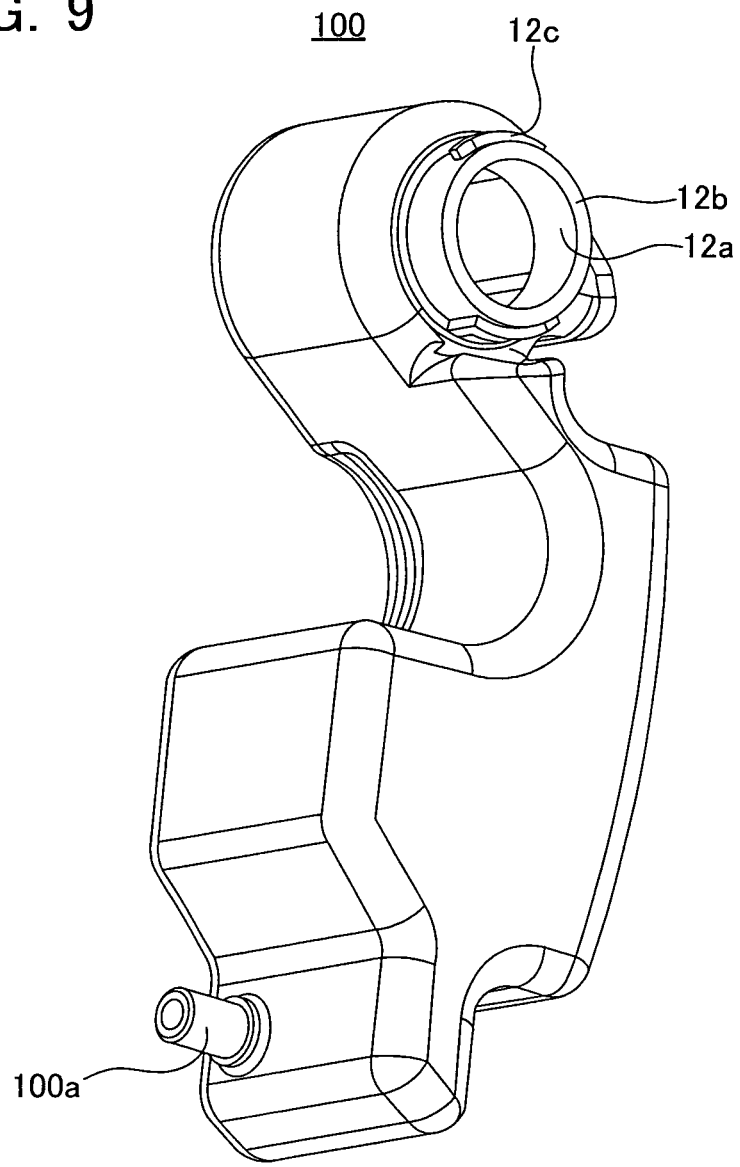
FIG. 9 shows a perspective view of the oil tank.

An oil tank 100 (refer to FIG. 9) is arranged on the body 12. FIG. 9 shows a perspective view of the oil tank 100. The oil tank 100 reserves lubricating oil that is supplied to the saw chain 32, the sprocket 38, and the like. The lubricating oil inside the oil tank 100 is discharged from a discharging part 100a of the oil tank 100 and supplied to the saw chain 32, the sprocket 38, and the like. An opening 12a (refer to FIG. 5) of the oil tank 100 closed by an oil cap 42, which will be described in detail later. The oil cap 42 is rotatably attached to the body 12. The oil cap 42 is attached to the oil tank 100 by an engagement between an inner thread 74b of a ring-like member 74, to be described later, and an external thread portion 12c of the oil tank 100.

The guide bar 30 is attached to the body 12. The guide bar 30 is arranged adjacent to the sprocket 38. The guide bar 30 is supported against the body 12 by a supporting bolt 34 and a supporting pin 36. The supporting bolt 34 and the supporting pin 36 are fixed to the body 12 and support the guide bar 30 so that the guide bar 30 is capable of. moving reciprocally relative to the body 12. In other words, the guide bar 30 is arranged capable of approaching/separating from the sprocket 38. The saw chain 32, not shown in FIG. 2, is provided with tension between the S sprocket 38 and the guide bar 30. When an operator operates a wheel 26, an adjusting pin 40 that engages with the guide bar 30 moves along a rotating shaft, not shown. Consequently, the operator can cause the guide bar 30 to approach/separate from the sprocket 38 and adjust the tension of the saw chain 32.

A cover 24 that covers the sprocket 38 and a fixed operating knob 28 for fixing the guide bar 30 are arranged on the side surface of the body 12. The fixed operating knob 28 is rotatably attached to the body 12. The fixed operating knob 28 is screwed onto the supporting bolt 34 that projects from the side surface of the body 12. When the fixed operating knob 28 is tightened relative to the supporting bolt 34, the guide bar 30 becomes fixed to the body 12, and when the fixed operating knob 28 is loosened relative to the supporting bolt 34, the guide bar 30 becomes capable of moving reciprocally relative to the body 12. The cover 24 is fixed by the fixed operating knob 28. The cover 24 can be detached from the body 12 by detaching the fixed operating knob 28 from the supporting bolt 34.

Next, operations of the chain saw 10 will be described. When the operator turns on the trigger switch 20, the motor 16 that is a power source rotates. Due to a rotation of the motor 16, the sprocket 38 is rotationally driven relative to the body 12. Consequently, the saw chain 32 that is a tool rotates along the sprocket 38 and the guide bar 30.

Figure 3:
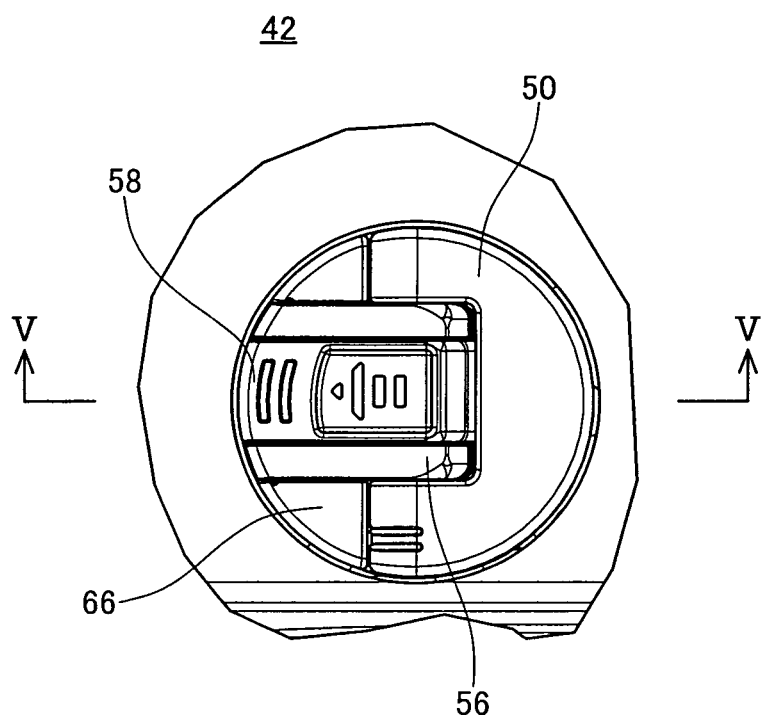
FIG. 3 shows an enlarged view of an oil cap.
Figure 4:
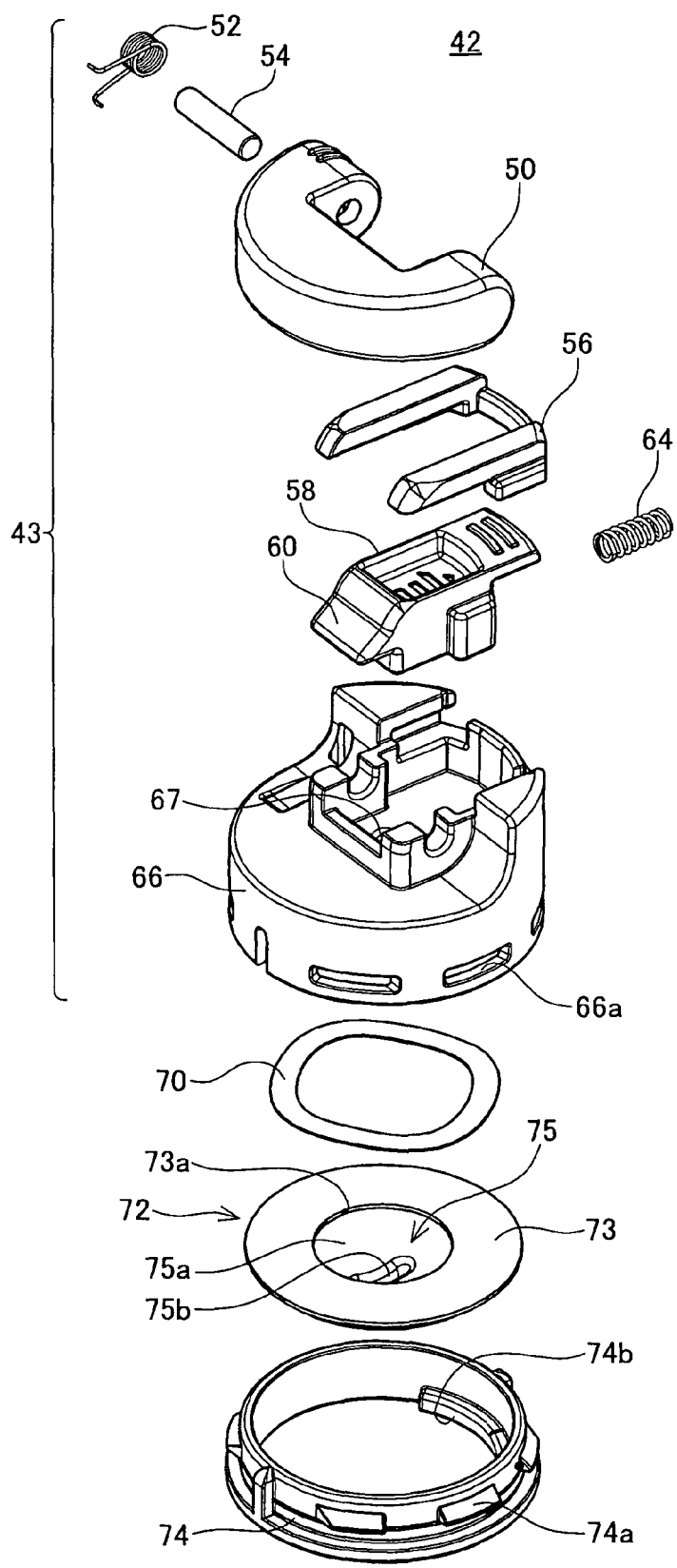
FIG. 4 shows an exploded perspective view of the oil cap.
Figure 5:
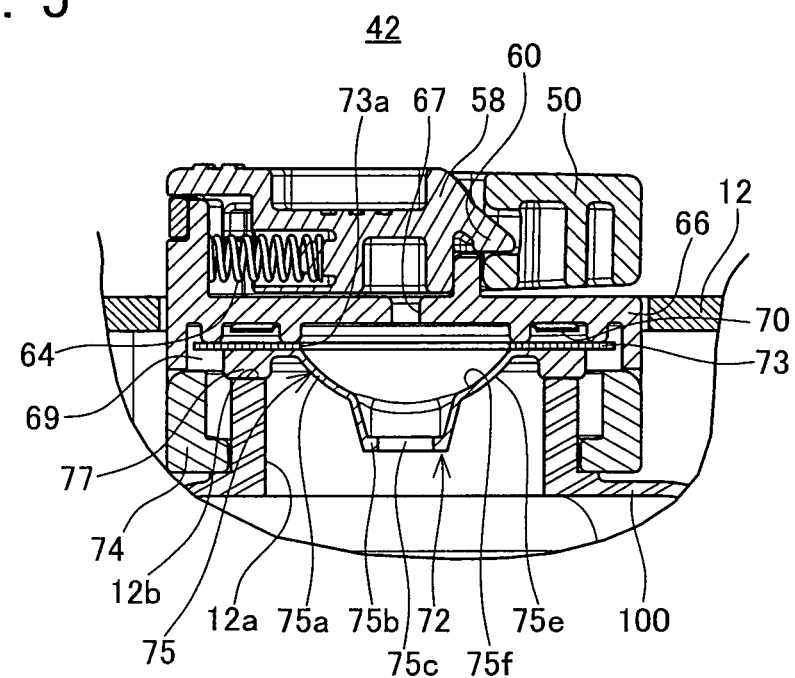
FIG. 5 shows a cross-sectional view of a V-V cross section of FIG. 3.

Next, a configuration of the oil cap 42 will be described. FIG. 3 shows an enlarged view of the oil cap 42. FIG. 4 shows an exploded perspective view of the oil cap 42. FIG. 5 shows a cross-sectional view of a V-V cross section of FIG. 3. The oil cap 42 comprises a cap body 43, a valve component 72, and the like. The cap body 43 comprises a knob body 66, a tab 50, a lock member 58, and the like. FIGS. 3 and 5 show a state in which the tab 50 is at a storing position. The knob body 66 is rotatably attached relative to the body 12.

A communicating path 67 that penetrates the knob body 66 is formed on the knob body 66. The communicating path 67 communicates the oil tank 100 to outside air. The tab 50 is attached to the knob body 66 via a swinging shaft (axis) 54 so as to be capable of swinging. The swinging shaft 54 is arranged at a position at which the swinging shaft 54 orthogonally intersects a center axis of rotation of the oil cap 42. The swinging shaft 54 is inserted through a torsion spring 52. The torsion spring 52 biases the tab 50 from the storing position toward an operating position. The tab 50 is locked to the storing position by the lock member 58. The lock member 58 is slidably attached to the knob body 66. The lock member 58 is slidably arranged relative to the knob body 66 between a lock position that locks the tab 50 to the storing position as shown in FIGS. 3 and 5 and an unlock position that disengages the locking of the tab 50. The lock member 58 is biased to the lock position by a spring 64. The lock member 58 slides along a fixed guide member 56 of the knob body 66.

The tab 50 is locked at the storing position by engaging with the engaging portion 60 of the lock member 58 at the lock position. When an operator moves the lock member 58 from the lock position to the unlock position, the tab 50 swings toward the operating position due to a biasing force of the torsion spring 52. The tab 50 projects from the knob body 66 at the operating position. Consequently, the operator can hold the tab 50 and rotationally move the oil cap 42 relative to the body 12.

The valve component 72 is attached to the knob body 66 on an opening 12a side of the oil tank. The valve component 72 comprises a valve member 75 and a supporting plate 73. The supporting plate 73 is a ring-shaped flat plate. The supporting plate 73 is arranged so that an opening 73a formed at a center of the supporting plate 73 is concentric with the communicating path 67 of the knob body 66. The supporting plate 73 is arranged between the knob body 66 and the ring-like member 74. A locking part 74a of the ring-like member 74 engages with a locking hole 66a formed on the knob body 66. Accordingly, the ring-like member 74 is fixed to the knob body 66. An outer edge part of the supporting plate 73 is positioned in a clearance 69 between the knob body 66 and the ring-like member 74. Accordingly, the supporting plate 73 is capable of swinging relative to the knob body 66. In addition, the valve component 72 is rotatably supported in a circumferential direction of the supporting plate 73 relative to the knob body 66. The supporting plate 73 is biased toward the ring-like member 74 by a wave washer 70.

Figure 6:
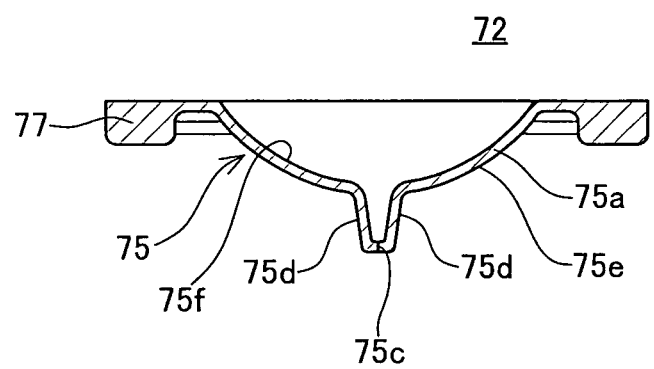
FIG. 6 shows a cross-sectional view of a valve member.

The valve member 75 is fixed to a surface of the supporting plate 73 on an oil tank 100 side. The valve member 75 is a sheet-shaped (thin) portion and, for example, is formed from an elastomer that is an elastic polymer such as silicon rubber. FIG. 6 is a cross-sectional view of the valve member 75. FIG. 6 shows a cross section perpendicular to the cross section shown in FIG. 5. The valve member 75 comprises a bulging. part 75a, a projecting part 75b, and a sealing part 77. The sealing part 77 is formed on an outer edge of the valve member 75. The sealing part 77 has an outer diameter that is approximately equal to the opening 12a of the oil tank. The sealing part 77 comes into contact with an edge of the opening 12b of the opening 12a in a state where the oil cap 42 is attached to the oil tank 100. Accordingly, the sealing part 77 seals a clearance between the oil tank 100 and the oil cap 42.

The bulging part 75a is formed at a central part of the valve member 75. The bulging part 75a has a shape in which a central part bulges relative to a peripheral part toward an inside of the oil tank 100. In other words, the bulging part 75a bulges toward an inner surface 75e side of the valve member 75 which receives a gas pressure inside the oil tank 100. More specifically, the bulging part 75a has a shape which is curved like a dome and which corresponds to a part of a spherical surface. The projecting part 75b is formed on a top portion of the bulging part 75a or, in other words, a lower end part of the bulging part 75a shown in FIGS. 5 and 6. The projecting part 75b projects from the top portion of the bulging part 75a toward the inside of the oil tank 100 or, in other words, toward the surface 75e side of the valve member 75. The projecting part 75b projects in a sac-like shape. The projecting part 75b comprises a pair of flat plate portions 75d which oppose each other. The flat plate portions 75d gradually approach each other toward the top portion of the projecting part 75b. A slit 75c is formed at the top portion of the projecting part 75b. The slit 75c extends perpendicular to a direction in which the flat plate portions 75d oppose each other.

Next, operations of the valve member 75 will be described. As shown in FIG. 6, when a gas pressure inside the oil tank 100 and atmospheric pressure, in other words a gas pressure inside the valve member 75, are in equilibrium, the slit 75c of the projecting part 75b is closed. As the oil inside the oil tank 100 is discharged to the outside, the gas pressure inside the oil tank 100 drops.

Figure 7:
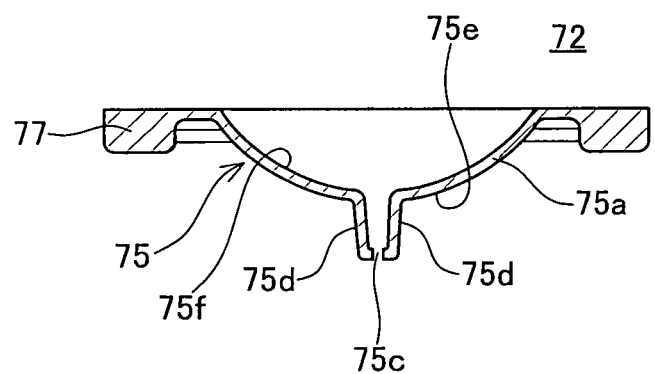
FIG. 7 shows a cross-sectional view of the valve member when a gas pressure inside an oil tank drops.

FIG. 7 shows a state in which the gas pressure inside the oil tank 100 has dropped. When the gas pressure inside the oil tank 100 drops and a difference between the gas pressure inside the oil tank 100 and atmospheric pressure exceeds a predetermined value, the bulging part 75a and the projecting part 75b deform so as to bulge. The bulging part 75a elastically deforms toward an inner surface 75e side of the valve member 75. In particular, the projecting part 75b deforms so that the pair of flat plate portions 75d separates from each other. As a result, the slit 75c arranged at the top portion of the projecting part 75b opens. Accordingly, the outside air is introduced into the oil tank 100 and the gas pressure inside the oil tank 100 rises.

Figure 8:
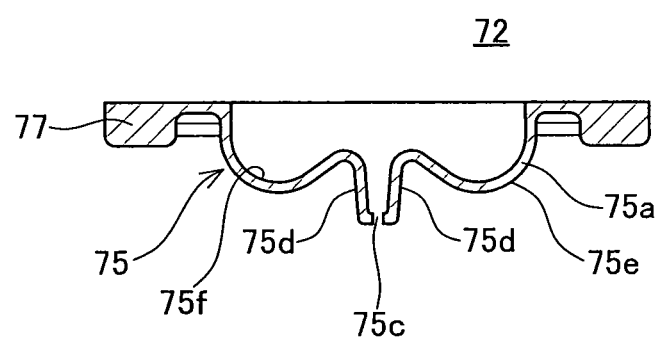
FIG. 8 shows a cross-sectional view of the valve member when the gas pressure inside the oil tank rises.

On the other hand, FIG. 8 shows a state in which the gas pressure inside the oil tank 100 has risen. When the gas pressure inside the oil tank 100 becomes higher than the atmospheric pressure, the gas pressure inside the oil tank 100 causes the bulging part 75a of the valve member 75 to deform significantly so as to cave in. In other words, the bulging part 75a elastically deforms toward an outer surface 75f side of the valve member 75. When the bulging part 75a deforms so as to cave in, the projecting part 75b integrally formed therewith is affected and also deforms, thereby the slit 75c opens. As a result, the gas inside the oil tank 100 is discharged to the outside of the oil tank. Accordingly, the gas pressure inside the oil tank 100 drops.

The valve member 75 is attached to the oil cap 42 according to the present embodiment in order to adjust the gas pressure inside the oil tank 100. The slit 75c of the valve member 75 is opened by a difference between the gas pressure inside the oil tank 100 and atmospheric pressure both when introducing the outside air into the oil tank 100 and when discharging the gas inside the oil tank 100 to the outside of the oil tank 100. In other words, the valve member 75 functions both as an air intake valve that introduces the outside air into the oil tank 100 and an exhaust valve that discharges the gas inside the oil tank 100 to the outside of the oil tank 100. According to this configuration, the air intake valve and the exhaust valve need not be separately arranged and a configuration of the valve component 72 can be simplified. In addition, by arranging the bulging part 75a that deforms significantly due to the difference in gas pressures inside and outside the oil tank 100, the slit 75c can be opened wide particularly when the gas pressure inside the oil tank 100 is greater than atmospheric pressure. Furthermore, the bulging part 75a bulges toward the inside of the oil tank 100 and the projecting part 75b projects toward the inside of the oil tank 100. Therefore, a space for arranging the valve member 75 of the oil cap 42 can be reduced.

Moreover, the sealing part 77 is integrally formed with the valve member 75. Therefore, assembly of the oil cap 42 becomes easier.

In addition, the valve component 72 is supported so as to be capable of swinging relative to the knob body 66. According to this configuration, the valve component 72 is positioned when the sealing part 77 and the edge of the opening 12b come into contact with each other. Due to the swinging of the valve component 72, formation of a clearance between the sealing part 77 and the edge of the opening 12b as a result of contacting only a part of the sealing part 77 with the edge of the opening 12b can be prevented. Therefore, the edge of the opening 12b and the valve component 72 of the oil tank 100 need not be formed at high precision.

The oil cap 42 is attached to/detached from the oil tank 100 by rotationally moving the oil cap 42 relative to the oil tank 100. The sealing part 77 is in contact with the edge of the opening 12b of the oil tank 100. The valve component 72 is rotatably supported in the circumferential direction of the supporting plate 73 relative to the knob body 66. In addition, a friction coefficient between the wave washer 70 and the supporting plate 73 is smaller than a friction coefficient between the sealing part 77 and the edge of the opening 12b. Due to this relationship, when the oil cap 42 is being rotationally moved, a friction force between the sealing part 77 and the edge of the opening 12b restricts the rotation of the valve component 72. relative to the edge of the opening 12b and a position of the valve component 72 is maintained. On the other hand, the knob body 66 rotationally moves relative to the valve component 72 due to sliding of the wave washer 70 and the supporting plate 73. Consequently, abrasion of the sealing part 77 due to the sealing part 77 sliding to the edge of the opening 12b can be prevented.

(Modifications)

In the embodiment described above, the bulging part 75a of the valve member 75 has a shape that follows a part of a spherical surface. However, the shape of the bulging part 75a is not limited thereto. For example, the shape of the bulging part 75a may be conical or trapezoidal pyramid. In addition, a central part of the valve member 75 need not be bulged.

Furthermore, in the embodiment described above, the sealing part 77 is integrally formed with the valve member 75. However, the valve member 75 and the sealing part 77 may be formed separately.

The chain saw 10 is described in the embodiment above. However, for example, a power tool such as a hedge cutter or a grass cutter, a hedge trimmer, a lawn mower, a grass cutter, or a bush cutter may be adopted instead. In addition, the valve component 72 is arranged in the oil cap 42 of the oil tank 100. However, the valve component 72 can be used in various parts for adjusting gas pressure inside the reservoir such as the cap of a fuel tank that reserves fuel for an engine or the like.

Specific embodiment of the present teachings is described above, but this merely illustrates some representative possibilities for utilizing the teachings and does not restrict the claims thereof. The subject matter set forth in the claims includes variations and modifications of the specific examples set forth above. The technical elements disclosed in the specification or the drawings may be utilized separately or in all types of combinations, and are not limited to the combinations set forth in the claims at the time of filing of the application. Furthermore, the subject matter disclosed herein may be utilized to simultaneously achieve a plurality of objects or to only achieve one object.

The invention claimed is:

1. A power tool comprising:
   a reservoir reserving oil, said reservoir comprising:
      a rim surrounding an opening and having;
      an interior having an interior pressure; and,
      an exterior having an exterior pressure;
   a cap attached to the opening, said cap comprising:
      a cap body having a communicating path extending between the interior and the exterior;
      a valve covering the communicating path, the valve comprising:
         an integral sealing flange for sealing the cap to the rim of the reservoir;
         a central portion having a projecting part with a slit, the slit deforming between a closed position to an open position, and the central portion elastically deforming between:
            a non-bulging orientation wherein the central portion has not significantly deformed and the slit remains in the closed position, the non-bulging orientation occurring when the exterior pressure and the interior pressure are in equilibrium;
            an inward bulging orientation wherein the central portion extends away from the exterior of the reservoir toward the interior of the reservoir and the slit outwardly deforms to the open position, the inward bulging orientation occurring when the exterior pressure substantially exceeds the interior pressure; and,
            an outward bulging orientation wherein the central portion extends away from the interior of the reservoir toward the exterior of the reservoir and the slit inwardly deforms to the open position, the outward bulging orientation occurring when the interior pressure substantially exceeds the exterior pressure;
   a supporting plate arranged between the cap body and the rim of the reservoir, the supporting plate capable of swinging relative to the cap body;
   a biasing member biasing the supporting plate toward the rim, the biasing member being disposed between the cap body and the supporting plate; and,
   wherein the supporting plate and the biasing member cooperate to allow the integral sealing flange of the cap to sealingly engage the rim of the reservoir.

2. The power tool of claim 1, wherein the valve is sheet-shaped and made from elastomer.

3. The power tool of claim 1, wherein the projecting part comprises a pair of flat plate portions perpendicularly opposing each other relative to the slit.

4. A power tool configured to adjust gas pressure, the power tool comprising:
   a reservoir configured to store oil, the reservoir having:
      an interior having an interior pressure;
      an exterior having an exterior pressure; and,
      an opening disposed between the interior and the exterior;
   a cap configured to be attached to the opening of the reservoir, the cap comprising:
      a cap body having a pathway configured to communicate between the interior and the exterior; and,
      a valve membrane configured to be attached to the cap body for covering the pathway, the valve membrane including:
         an integral sealing flange for sealing the cap to a rim of the reservoir;
         a central portion having a projecting part with a slit, the slit deforming between a closed position to an open position, and the central portion elastically deforming between:
            a non-bulging orientation wherein the central portion has not significantly deformed and the slit remains in the closed position, the non-bulging orientation occurring when the exterior pressure and the interior pressure are in equilibrium;
            an inward bulging orientation wherein the central portion extends away from the exterior of the reservoir toward the interior of the reservoir and the slit outwardly deforms to the open position, the inward bulging orientation occurring when the exterior pressure substantially exceeds the interior pressure; and,
            an outward bulging orientation wherein the central portion extends away from the interior of the reservoir toward the exterior of the reservoir and the slit inwardly deforms to the open position, the outward bulging orientation occurring when the interior pressure substantially exceeds the exterior pressure;
   a supporting plate arranged between the cap body and the rim of the reservoir, the supporting plate capable of swinging relative to the cap body;
   a biasing member biasing the supporting plate toward the rim, the biasing member being disposed between the cap body and the supporting plate; and,
   wherein the supporting plate and the biasing member cooperate to allow the integral sealing flange of the cap to sealingly engage the rim of the reservoir.

5. The power tool of claim 4, wherein the valve membrane is made from an elastomeric material.

* * * * *